US012724200B2

(12) United States Patent
Carbone

(10) Patent No.: US 12,724,200 B2
(45) Date of Patent: Sep. 1, 2026

(54) CLAD LIGHT STRIPPER WITH LIGHT TRAPS

(71) Applicant: nLIGHT, Inc., Camas, WA (US)

(72) Inventor: Kevin Michael Carbone, Camas, WA (US)

(73) Assignee: nLIGHT, Inc., Camas, WA (US)

( * ) Notice: Subject to any disclaimer, the term of this patent is extended or adjusted under 35 U.S.C. 154(b) by 658 days.

(21) Appl. No.: 18/015,945

(22) PCT Filed: Jul. 13, 2021

(86) PCT No.: PCT/US2021/041410
§ 371 (c)(1),
(2) Date: Jan. 12, 2023

(87) PCT Pub. No.: WO2022/015718
PCT Pub. Date: Jan. 20, 2022

(65) Prior Publication Data

US 2023/0258868 A1 Aug. 17, 2023

Related U.S. Application Data

(60) Provisional application No. 63/051,488, filed on Jul. 14, 2020.

(51) Int. Cl.
*G02B 6/24* (2006.01)
*G02B 6/245* (2006.01)
(Continued)

(52) U.S. Cl.
CPC ............... *G02B 6/245* (2013.01); *G02B 6/25* (2013.01); *H01S 3/06733* (2013.01); *H01S 3/06745* (2013.01)

(58) Field of Classification Search
CPC ....... G02B 6/245; G02B 6/25; H01S 3/06733; H01S 3/06745
See application file for complete search history.

(56) References Cited

U.S. PATENT DOCUMENTS 4,382,655 A * 5/1983 Jamieson ................. G02B 6/43 359/558
6,704,479 B2 * 3/2004 Koplow ............... G02B 6/4214 385/27

(Continued)

FOREIGN PATENT DOCUMENTS

CN 108565665 A 9/2018
CN 108565665 B * 11/2023 ........... H01S 3/0407

OTHER PUBLICATIONS

CN-108565665-B—English language text (Year: 2023).*

(Continued)

*Primary Examiner* — Peter Radkowski
(74) *Attorney, Agent, or Firm* — Wiley Rein LLP

(57) ABSTRACT

A mounting surface defines a branching channel, the branching channel having a main channel and one or more subchannels branching off the main channel. An optic fiber is affixed to the mounting surface, the optic fiber including a cladding layer and an interior surrounded by the cladding layer, wherein part of the optic fiber is suspended over the main channel. A clad light stripper includes one or more discontinuities in an outer surface of the cladding layer of a suspended section of the optic fiber, the one or more outer surface discontinuities to release a portion of the process light. The one or more subchannels include a first subchannel having an ingress located to capture released light from an individual one of the one or more discontinuities and trap at least a portion thereof.

20 Claims, 5 Drawing Sheets

(51) Int. Cl.
*G02B 6/25* (2006.01)
*H01S 3/067* (2006.01)

(56) References Cited

U.S. PATENT DOCUMENTS 6,937,342 B2 * 8/2005 Osinski .................. G01C 19/72 356/461
7,090,411 B2 * 8/2006 Brown ................. G02B 6/4296 385/92
7,373,070 B2 * 5/2008 Wetter ..................... G02B 6/36 385/134
7,839,901 B2 * 11/2010 Meleshkevich .... G02B 6/03616 385/124
8,027,555 B1 * 9/2011 Kliner .................. G02B 6/2852 385/29
8,433,161 B2 * 4/2013 Langseth ............ H01S 3/06708 385/27
8,537,871 B2 * 9/2013 Saracco ............. G02B 6/02395 372/64
8,542,971 B2 * 9/2013 Chatigny ............ H01S 3/06704 385/134
8,867,872 B2 * 10/2014 Sercel ...................... G02B 6/26 385/129
9,116,296 B2 * 8/2015 Fisher .................... G02B 6/255
9,151,890 B2 * 10/2015 Sercel ...................... G02B 6/12
9,213,135 B2 * 12/2015 Ilyashenko ........ G02B 6/02052
9,435,945 B2 * 9/2016 Gapontsev ........... G02B 6/0208
9,547,121 B2 * 1/2017 Hou ...................... H01S 3/0941
9,557,484 B1 * 1/2017 Norberg ............... G02B 6/1228
10,120,151 B1 * 11/2018 Chin .................... G02B 6/4296
10,175,435 B2 * 1/2019 Peng .................... G02B 6/0006
10,310,201 B2 * 6/2019 Kliner ................... H01S 3/0064
10,649,162 B2 * 5/2020 Peng .................... G02B 6/0006
11,054,596 B2 * 7/2021 Peng ...................... A61B 18/22
11,575,239 B2 * 2/2023 Kokki ............... H01S 3/094007
11,604,324 B2 * 3/2023 Peng ........................ G02B 6/02
2003/0021529 A1 * 1/2003 Koplow .............. H01S 3/06708 385/127
2003/0030814 A1 * 2/2003 Osinski .................. G01C 19/72 356/461
2004/0151460 A1 * 8/2004 Kitcher .................. G02B 6/122 385/129
2005/0025418 A1 * 2/2005 Brown ................. G02B 6/4296 385/88
2007/0206909 A1 * 9/2007 Wetter ................. G02B 6/0218 385/92
2010/0135339 A1 * 6/2010 Meleshkevich .... G02B 6/03616 385/124
2011/0110625 A1 * 5/2011 Chatigny ............ G02B 6/3636 156/60
2012/0070115 A1 * 3/2012 Langseth ................. G02B 6/14 427/163.2
2012/0262938 A1 * 10/2012 Price ...................... G02B 6/262 362/553
2013/0016740 A1 * 1/2013 Saracco ............ G02B 6/02395 372/6
2013/0087694 A1 * 4/2013 Creeden .............. H01S 3/06758 250/227.11
2013/0308897 A1 * 11/2013 Sercel .................. G02B 6/4286 385/14
2014/0211818 A1 * 7/2014 Hou .................... H01S 3/06729 372/6
2014/0369645 A1 * 12/2014 Sercel ...................... G02B 6/12 385/14
2015/0049983 A1 * 2/2015 Fisher ..................... B32B 37/12 385/29
2015/0260911 A1 * 9/2015 Ilyashenko ......... H01S 3/10023 372/6
2015/0370009 A1 * 12/2015 Gapontsev .............. H01S 3/067 385/128
2018/0059343 A1 * 3/2018 Kliner ............... H01S 3/094007
2018/0098811 A1 * 4/2018 Peng ...................... A61B 18/22
2019/0113700 A1 * 4/2019 Peng .................. G02B 6/02147
2020/0099190 A1 * 3/2020 Kokki ................. H01S 3/08018
2020/0233163 A1 * 7/2020 Peng .................... A61B 18/201
2021/0294051 A1 * 9/2021 Peng ........................ G02B 6/02

OTHER PUBLICATIONS

International Search Report and Written Opinion dated Dec. 16, 2021, for International Patent application No. PCT/US2021/041410.

International Preliminary Report on Patentability dated Jan. 26, 2023, for International Patent Application No. PCT/US2021/041410.

* cited by examiner 413
422
421
423

413
422
423
421

413
422
423
421

400

CLAD LIGHT STRIPPER WITH LIGHT TRAPS

PRIORITY

This United States Non-Provisional Patent Application is a National Stage Entry that relies on and claims priority from International Patent Application No. PCT/US2021/041410, filed on Jul. 13, 2021, and also relies on and claims priority to U.S. Provisional Application No. 63/051,488, filed on Jul. 14, 2020, entitled IMPROVED CLAD LIGHT STRIPPER, the contents of both of which are incorporated by reference herein in their entireties.

TECHNICAL FIELD

The present disclosure relates to fiber lasers.

BACKGROUND

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources. There is great demand for high power and high efficiency diode lasers, the former for power scaling and price reduction (measured in $/Watt) and the latter for reduced energy consumption and extended lifetime.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Figure 1:
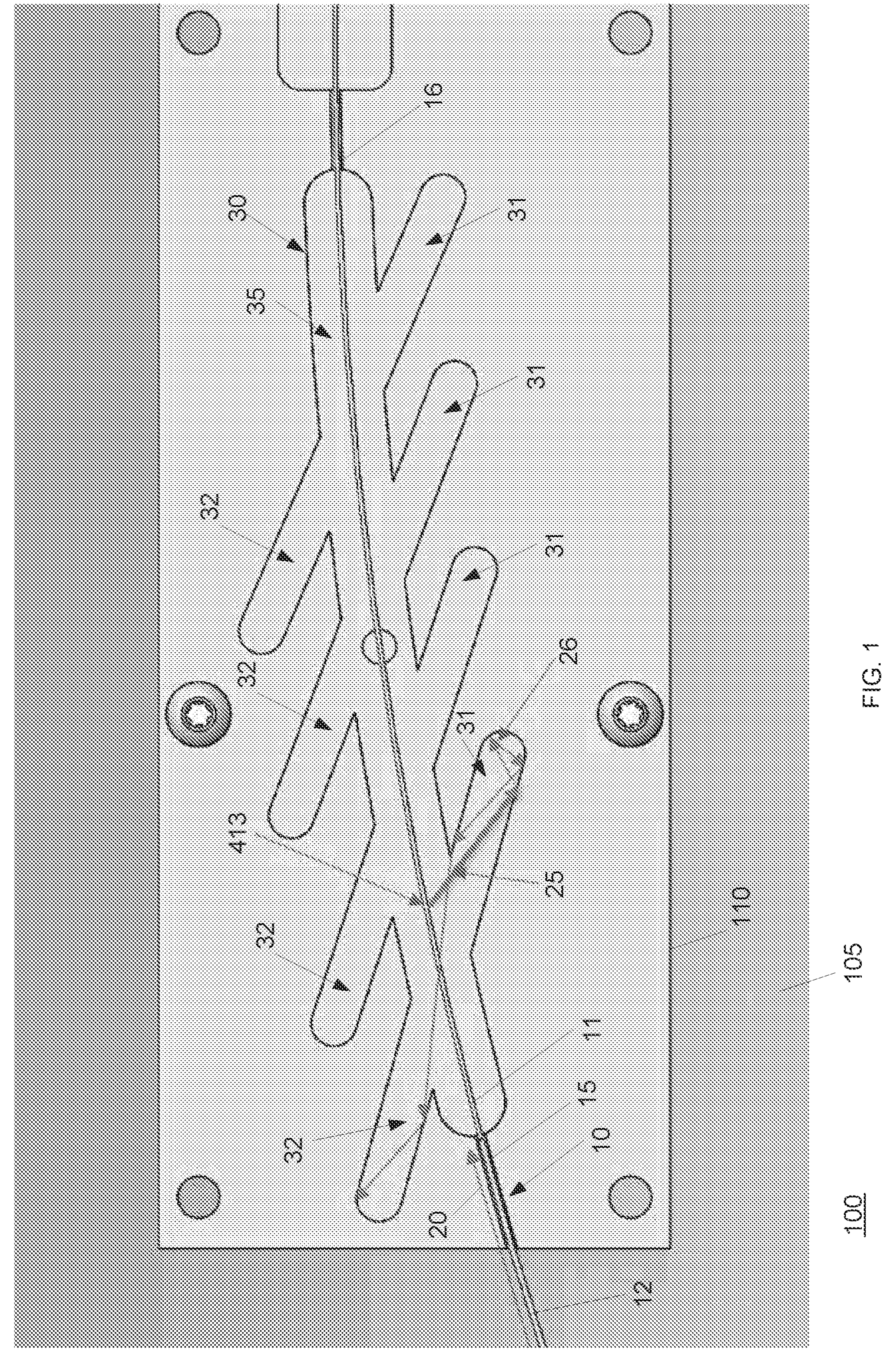
FIG. 1 illustrates a schematic diagram of a optic fiber module with light traps, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Some current clad light strippers (CLS) used in high power applications may include an optic fiber affixed to a mounting surface in which part of the optic fiber is suspended over a channel. The optic fiber may include a cladding layer and an interior surrounded by the cladding layer to propagate light originating from a light source toward a destination.

A discontinuity is provided in an outer surface of cladding layer of the suspended section of the fiber to strip light propagating in the cladding layer. The released light is released into the channel where it may reflect several times—each reflection location may absorb heat.

Although the heat may be released in multiple locations in the channel, much of the light is ultimately absorbed at an end of the channel. Due to this, the end of the channel may be subjected to extreme temperature changes, which may ultimately cause a fiber failure near the ends of the fiber close to where the polymer bonds it to the housing (the optical fiber is suspended over the channel by attaching the optical fiber to the housing near ends of the channel using a bonding material).

Some embodiments may direct less energy to an end of the channel, which may allow for higher power capabilities in the same package and/or reduce thermal stresses on the fiber. In various embodiments, heat derived from the light released from the cladding layer may be directed away from the optical fiber, which not only protects the optical fiber from stress but also may more effectively transfer heat to a cold plate or other heat sink (because the heat is absorbed over a larger area of the mounting surface).

Figure 5:
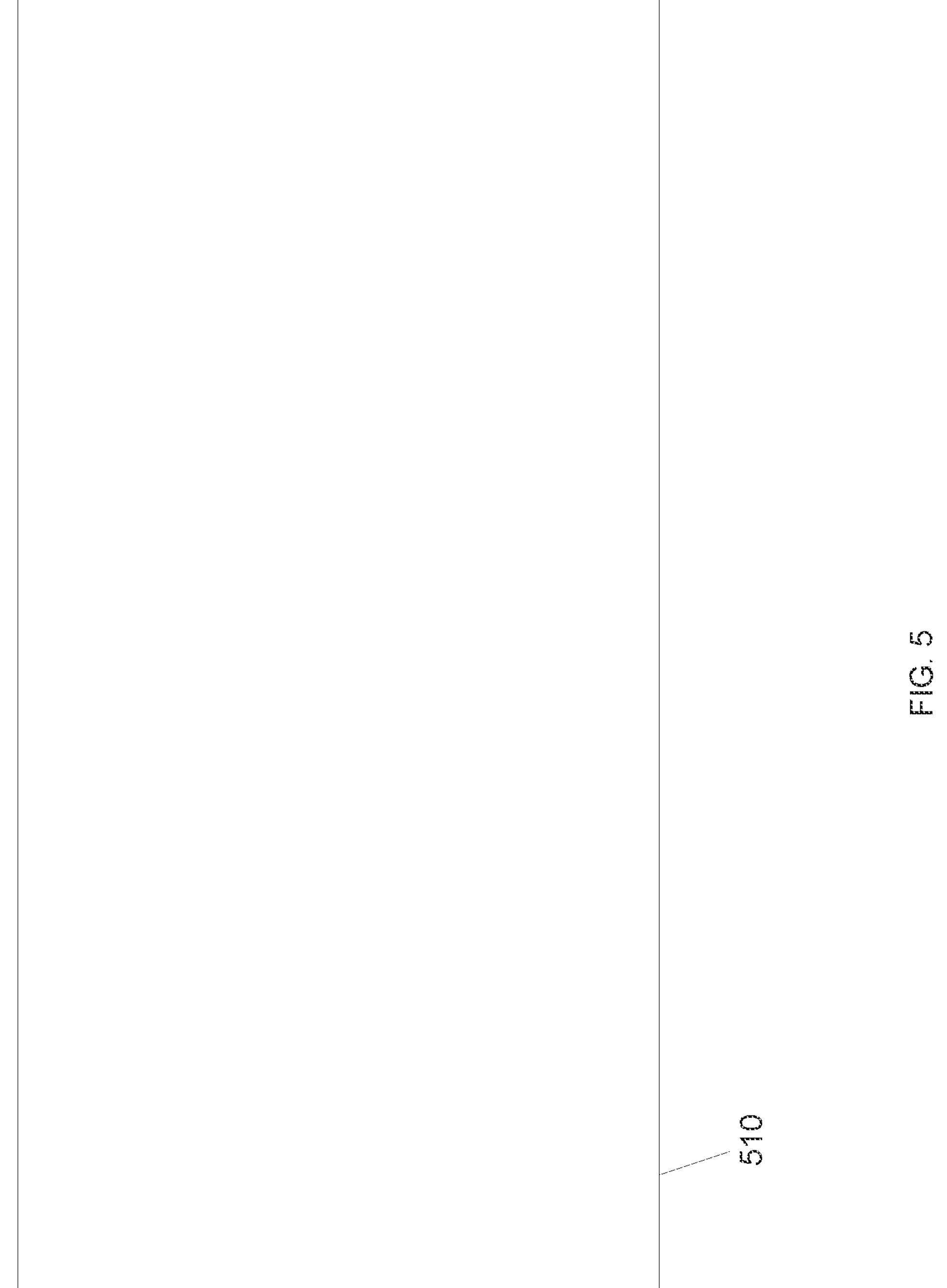
FIG. 5 illustrates a top view of a lid usable with the optic fiber module of FIG. 1, according to various embodiments.

FIG. 1 illustrates a schematic diagram of an optic fiber module 100 with light traps, according to various embodiments. The optic fiber module 100 includes a mounting surface 110 fastened to (and thermally coupled to) a back side 105 of a cold plate (or other heat sink). The mounting surface 110 defines a branching channel 30 that includes a main channel 35 and sub-channels 31 and 32. A lid 510 (FIG. 5) or other cover may be located on top of the mounting surface 110 during operation to enclose the branching channel 30. The lid 510 or other cover may be mounted to the mounting surface 110. The lid 510 or other cover may be thermally coupled to the sub-channels 31 and 32 and therefore may contribute to heat dissipation of the generate generation by the released/reflected light 25/26 intersecting the sub-channels 31 and 32.

A coating/buffer 12 of the optic fiber 10 is affixed to the mounting surface 110 near ends of the main channel 35 using adhesives 15 and 16. A section of the optic fiber 10, which is stripped of its coating/buffer (to expose a cladding layer) is suspended over the main channel 35.

The suspended section of the optic fiber 10 includes a cladding layer and an interior surrounded by the cladding layer (the interior propagates light originating from a light source toward a destination in the direction 20). A clad light stripper is provided by forming a discontinuity 413 in an outer surface of the cladding layer.

Figures 2A, 2B, 2C:
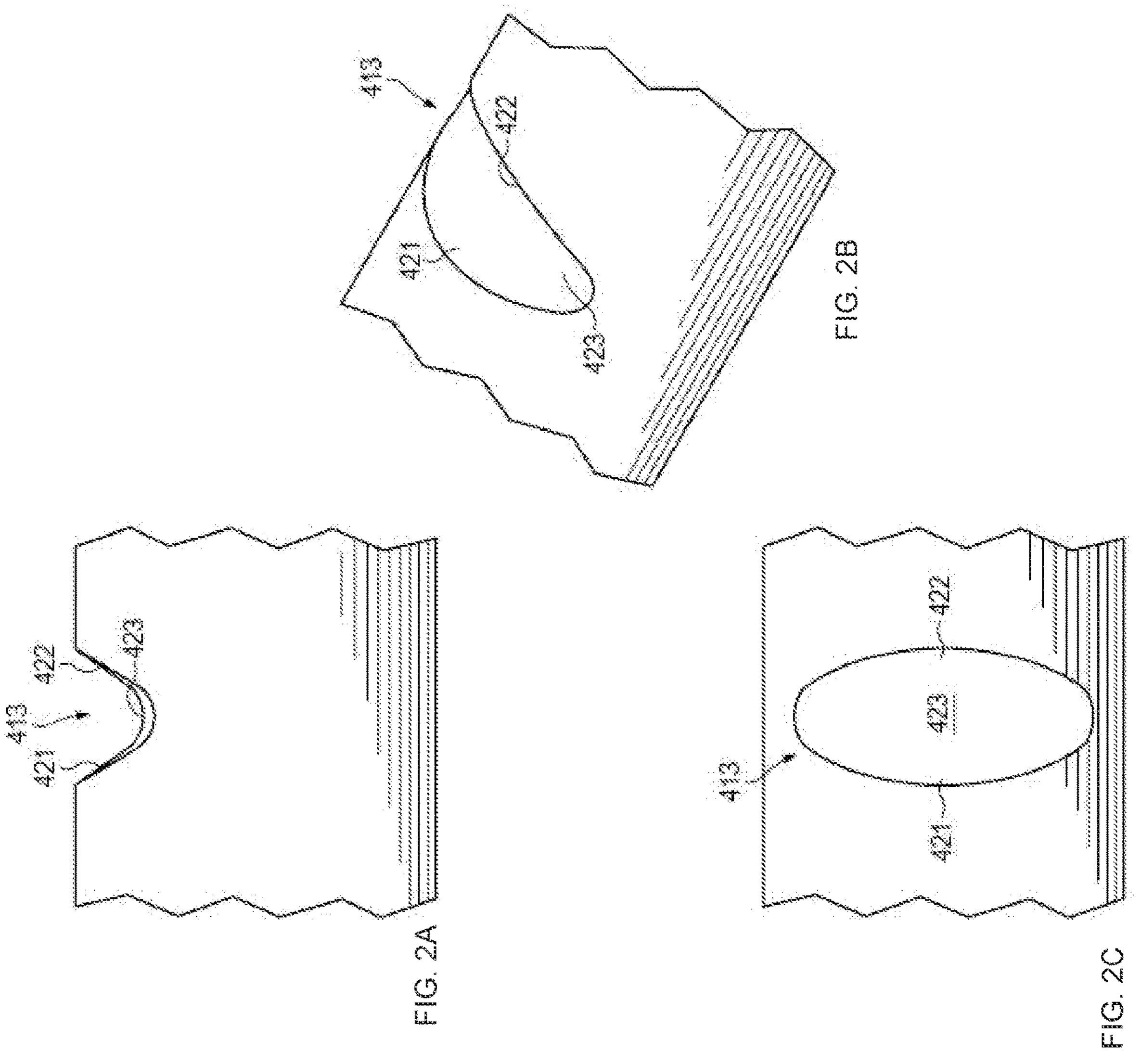
FIG. 2A illustrates a side view of a section of the optic fiber of FIG. 1, according to various embodiments.
FIG. 2B illustrates an isometric view of the optic fiber section of FIG. 2A.
FIG. 2C illustrates a top view of optic fiber section of FIG. 2A.

Discontinuity 413 may be formed by notching the cladding layer- and an example shape of the discontinuing 413 is shown in FIGS. 2A-C. Referring to FIG. 2A, the surface discontinuity 413 may be formed by laser machining, to form smooth sidewalls 421 and 422. In this example, the surface discontinuity 413 is symmetric (with sidewalls 421 and 422 having identical slopes), but in other examples a surface discontinuity may be asymmetric (with differently sloped sidewalls). In this example, the surface discontinuity 413 has a rounded bottom 423 based on the laser machining, but in other examples a surface discontinuity may have a flat bottom or may not have any bottom (e.g., V-shaped with a vertex formed by the sidewalls). In this example, the sidewalls 421 and 422 have linear slopes, but in other examples the sidewalls may have non-linear slopes or may be faceted. Any surface discontinuity may have a surface arranged to release the cladding light by scattering the cladding light, deflecting the cladding light using specular deflection, or the like, or combinations thereof. FIG. 2B illustrates an isometric view of the surface discontinuity 413, and FIG. 2C illustrates a top view of the surface discontinuity 413. In other examples, discontinuities in an outer surface of a cladding layer may be formed using any approach now known, or later developed.

Figure 3:
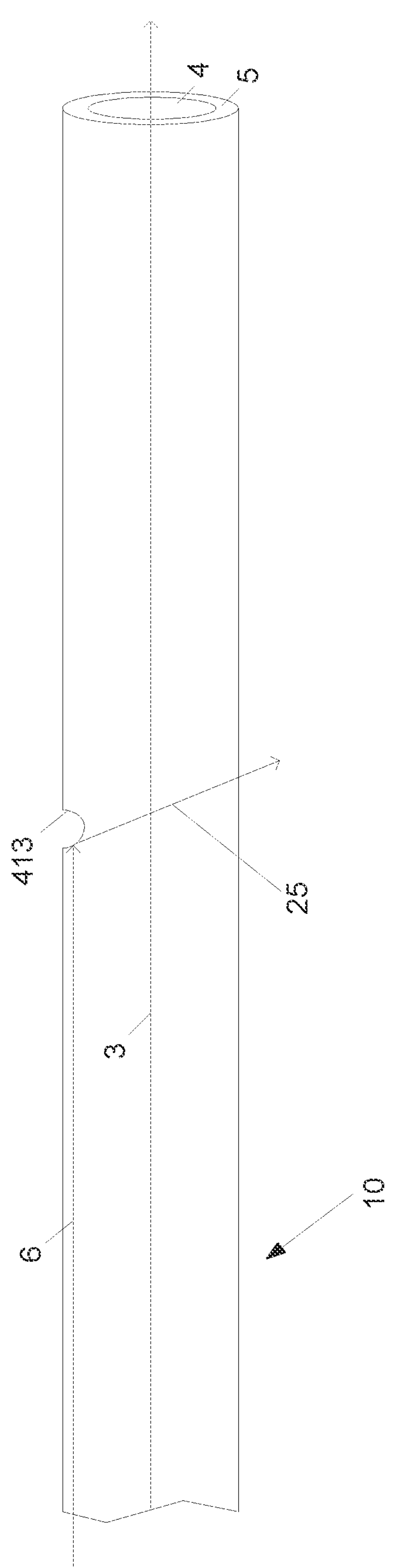
FIG. 3 illustrates a schematic diagram illustrating how the section of the optic fiber of FIGS. 2A-C releases clad light, according to various embodiments.

Referring now to FIG. 3, a truncated section of the optical fiber 10 around the discontinuity 413 is schematically shown to illustrate the release of cladding light 25 due to the discontinuity 413. This view shows the cladding layer 5, and the interior 4 that propagates the light 3 towards a destination. However, the cladding layer 5 also propagates light 6, which is removed by the discontinuity 413.

As illustrated, when the cladding light 6 reaches the discontinuity 413, it is re-directed at an angle, as illustrated. A majority of the released light 25 may pass through the material of the optic fiber and first enter air when exiting the opposite side of the optic fiber 10. If the optic fiber 10 were suspended over a non-branching channel, then in that case the released light 25 would be reflected by a sidewall of the non-branching channel to an opposite sidewall of the non-branching channel, etc.—essentially forward-reflecting off the sides of the non-branching channel until it reaches an end of the non-branching channel. Therefore, heat dissipation would be heavily localized where the fiber is affixed to the mounting surface, which may slow heat transfer to the cold plate or heat sink and also may lead to damage of the optic fiber 10 over time. The slow heat transfer is related to the heavy localization—the heat transfer is "bottlenecked" through a small heat path between a small area of the mounting surface and the back side of the cold plate or heat sink.

Referring again to FIG. 1, the ingress to the sub-channel 31 is located to capture the released light 25 so that it enters the sub-channel 31 directly (e.g., without interacting with the sidewalls of the main channel 35). Therefore, instead of reflecting off the sidewall of the main channel 35, the released light 25 is captured by the sub-channel 31, wherein it can be reflected one or more times by sidewalls of the sub-channel 31—transforming it into reduced energy light 26.

The ingress of the sub-channel 32 may be located to receive the reflected light 26 in the event that reflected light 26 has enough energy to exit the sub-channel 31. Some of the reflected light 26 may be reflected one or more times in the sub-channel 32.

Heat generated by released energy from the various reflections inside the sub-channels 31 and 32 may be isolated from the end of the main channel (and hence isolated from the part of the optic fiber that may be vulnerable to damage (the part adhered to the mounting surface 110 proximate to ends of the main channel 35). Also, since the heat is no longer heavily localized, there may be multiple heat paths from the mounting surface 110 to the back side 105 of the cold plate or heat sink, which avoids bottlenecking and heat accumulation.

As illustrated, the corresponding sub-channels 31 and 32 may have a same center line (e.g., may extend in opposite directions). However, this may not be required in other embodiments where sub-channels may be curved and/or extending in non-opposite directions. In these embodiments, an ingress of the sub-channel 31 is located to capture the released light 25 and an ingress of the corresponding sub-channel 32 is arranged to capture reflected light 26 exiting the sub-channel 31 regardless of the specific directions the sub-channels 31 and 32 extend to or whether they are straight or curved light traps. In various embodiments, the sub-channels 31 and 32 may include any light trap features now known or later developed, particularly wherein these light trap features allow energy from the released/reflected light 25/26 to be absorbed at the location the released/reflected light 25/26 intersects the sub-channels 31 and 32. Furthermore, in various embodiments the interior of the sub-channels 31 and 32 may have baffling, threading, or coating, or combinations thereof, that may increase the number of reflections and/or otherwise enhancing absorption of energy by the sub-channels 31 and 32. Also, in embodiments including the lid 510 (FIG. 5) or other cover, an underside of the lid 510 or other cover may have any of these features to increase the number of reflections (following an intersection of the released/reflected light 25/26 with the underside of the lid 510) and/or otherwise enhancing absorption of energy by the lid 510 or other cover.

Although only discontinuity 413 is marked for brevity, it should be appreciated that the optical fiber 10 may an additional discontinuity at a similar position relative to each additional sub-channel 31. Therefore, the optical fiber 10 may a row of discontinuity on one side of the optical fiber, in this embodiment.

In other embodiments, it may be possible and practical to have discontinuities on all sides of the optical fiber. For example, a continuous discontinuity could follow the path of a helix around the fiber. Such an embodiment would still trap some light in the sub-channels 31 and 32, which would overall reduce heat localization at the end of the main channel 35.

In various embodiments, the branching channel 30 may be formed by recessing the mounting surface using any known mechanical or chemical methods. In other embodiments, the mounting surface 110 may be fabricated by additive manufacturing.

Figure 4:
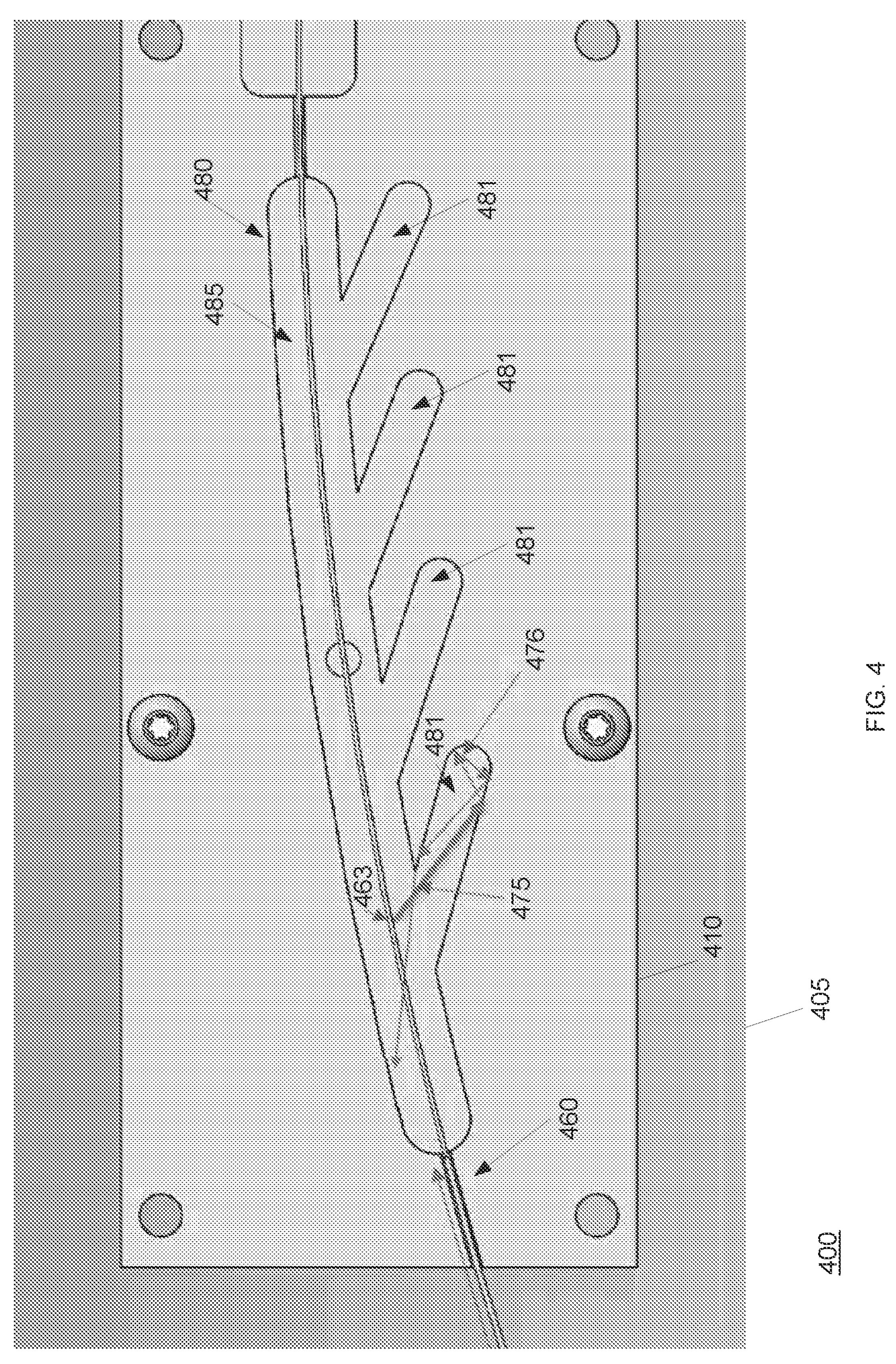
FIG. 4 illustrates a schematic diagram of another optic fiber module with light traps, according to various embodiments.

FIG. 4 illustrates a schematic diagram of another optic fiber module with light traps, according to various embodiments. The optic fiber module 400 includes a mounting surface 410 fastened (and thermally coupled to) a back side 405 of a cold plate or heat sink. The mounting surface 410 defines a branching channel 480 that includes a main channel 485 and sub-channels 481 arranged on one side of the main channel 485.

The optic fiber 410 may be similar in any respect to the optic fiber 10. The discontinuity 463 may be similar in any respect to the discontinuity 413. The sub-channels 481 may be similar in any respect to sub-channels 31.

In this embodiment, the released light 475 is still transformed into lower energy light 476 due to reflections in the sub-channel 481. If the lower energy light 476 exits the sub-channel 481, it may back-reflect in the main channel 485. Therefore, heat dissipation can be spread to a part of the main channel 485 that is located behind the discontinuity 463. This reduces the heat localization/accumulating at the opposite end of the main channel due to less forward reflections of released light. Therefore, a mounting surface with a branching channel 480 in which sub-channels 481 are located on a same side of the branching channel 480 may still reduce the likelihood of optical fiber failure due to better heat spreading and less heat accumulation.

Like the optic fiber module 100 (FIG. 1), the optic fiber module 400 may have additional discontinuities that release light into the ingresses of the additional sub-channels 481. Also, since light reflections of light derived from these discontinuities is backward traveling in the main channel 485, it may be possible to have yet further discontinuities that provide forward traveling reflections within the main channel 485—in this case there is a balance split between forward and rear traveling reflections, which may still limit beat localization.

Provided the ingresses to the sub-channels 481 are located to receive the released light 475, the sub-channels 481 need not be straight as shown. It may be possible and practical to have curved and/or spiraling light traps in place of the illustrated straight light traps.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An apparatus, comprising:

a mounting surface defining a branching channel, the branching channel having a main channel and one or more sub-channels branching off the main channel;

an optic fiber including a coating affixed to the mounting surface at ends of the main channel, a section of the optic fiber stripped of the coating to expose a cladding layer, and an interior surrounded by the cladding layer, wherein the interior propagates light originating from a light source toward a destination, wherein the section of the optic fiber stripped of the coating to expose the cladding layer is suspended over the main channel; and a clad light stripper including one or more discontinuities in an outer surface of the cladding layer of a suspended section of the optic fiber, the one or more outer surface discontinuities to release a portion of the process light;

wherein the one or more sub-channels include a first sub-channel having an ingress located to capture released light from an individual one of the one or more discontinuities and trap at least a portion thereof.

2. The apparatus of claim 1, wherein the one or more discontinuities are located on a same side of the outer surface of the cladding layer.

3. The apparatus of claim 2, wherein the side of the outer surface of the cladding layer is a first side, and wherein the ingress is closer a second opposite side of the outer surface of the cladding layer than the first side of the outer surface of the cladding layer.

4. The apparatus of claim 3, wherein the one or more sub-channels includes a second sub-channel with an ingress located to receive reflected light exiting the first sub-channel.

5. The apparatus of claim 4, wherein the first and second sub-channels are straight.

6. The apparatus of claim 5, wherein the first and second straight sub-channels have a same centerline.

7. The apparatus of claim 1, wherein the one or more sub-channels include additional first sub-channels each having an ingress located to capture released light from a different individual one of the one or more discontinuities.

8. The apparatus of claim 7, wherein the one or more sub-channels includes additional second sub-channels each having an ingress located to receive reflected light exiting a corresponding one of the additional first sub-channels.

9. The apparatus of claim 1, wherein the branching channel is defined on a front side of the mounting surface, and wherein a back side of the mounting surface is thermally coupled to a back side of cold plate or other heat sink.

10. The apparatus of claim 9, wherein the back side of the cold plate or other heat sink extends under both the main channel and the one or more sub-channels.

11. A fiber laser, comprising:

a laser source;

an optic fiber to receive laser light from the laser source, the optic fiber including a coating, a section of the optic fiber stripped of the coating to expose a cladding layer, and an interior surrounded by the cladding layer to propagate the laser light and output a laser beam derived from the laser light;

a mounting surface defining a branching channel, the branching channel having a main channel and one or more sub-channels branching off the main channel, wherein the coating is affixed to the mounting surface, and wherein the section of the optic fiber stripped of the coating to expose the cladding layer is suspended over the main channel; and a clad light stripper including one or more discontinuities in an outer surface of the cladding layer of a suspended section of the optic fiber, the one or more outer surface discontinuities to release a portion of the process light;

wherein the one or more sub-channels include a first sub-channel having an ingress located to capture released light from an individual one of the one or more discontinuities and trap at least a portion thereof.

12. The fiber laser of claim 11, wherein the one or more discontinuities are located on a same side of the outer surface of the cladding layer.

13. The fiber laser of claim 12, wherein the side of the outer surface of the cladding layer is a first side, and wherein the ingress is closer a second opposite side of the outer surface of the cladding layer than the first side of the outer surface of the cladding layer.

14. The fiber laser of claim 13, wherein the one or more sub-channels includes a second sub-channel with an ingress located to receive reflected light exiting the first sub-channel.

15. The fiber laser of claim 14, wherein the first and second sub-channels are straight.

16. The fiber laser of claim 15, wherein the first and second straight sub-channels have a same centerline.

17. The fiber laser of claim 11, wherein the one or more sub-channels include additional first sub-channels each having an ingress located to capture released light from a different individual one of the one or more discontinuities.

18. The fiber laser of claim 17, wherein the one or more sub-channels includes additional second sub-channels each having an ingress located to receive reflected light exiting a corresponding one of the additional first sub-channels.

19. The fiber laser of claim 11, wherein the branching channel is defined on a front side of the mounting surface, and wherein a back side of the mounting surface is thermally coupled to a back side of cold plate or other heat sink.

20. The fiber laser of claim 19, wherein the back side of the cold plate or other heat sink extends under both the main channel and the one or more sub-channels.

* * * * *